(12) United States Patent
Pfister et al.

(10) Patent No.: US 12,712,414 B2
(45) Date of Patent: Aug. 18, 2026

(54) ELECTRIC FAN DRIVE OF A MOTOR VEHICLE AND FAN MODULE

(71) Applicant: Brose Fahrzeugteile SE & Co. Kommanditgesellschaft, Würzburg, Würzburg (DE)

(72) Inventors: Martin Pfister, Wiesentheid (DE); Hermann Hehn, Leinach (DE)

(73) Assignee: Brose Fahrzeugteile SE & Co. Würzburg, Würzburg (DE)

( * ) Notice: Subject to any disclaimer, the term of this patent is extended or adjusted under 35 U.S.C. 154(b) by 212 days.

(21) Appl. No.: 18/594,270

(22) Filed: Mar. 4, 2024

(65) Prior Publication Data

US 2024/0213848 A1 Jun. 27, 2024

Related U.S. Application Data

(63) Continuation of application No. PCT/EP2022/073907, filed on Aug. 29, 2022.

(30) Foreign Application Priority Data

Sep. 3, 2021 (DE) ..................... 10 2021 209 722.7

(51) Int. Cl.
*H02K 5/22* (2006.01)
*F04D 25/06* (2006.01)

(52) U.S. Cl.
CPC ......... *H02K 5/225* (2013.01); *F04D 25/0693* (2013.01)

(58) Field of Classification Search
CPC .......... H02K 3/25; H02K 3/521; H02K 3/522; H02K 5/22; H02K 5/225; H02K 7/14; F04D 25/0693; H01R 11/12
See application file for complete search history.

(56) References Cited

U.S. PATENT DOCUMENTS 4,707,627 A 11/1987 Best
5,644,178 A 7/1997 Halm
(Continued)

FOREIGN PATENT DOCUMENTS

CN 105071087 B * 10/2017
CN 110808651 A * 2/2020 ......... H02K 11/0094
(Continued)

OTHER PUBLICATIONS

Ding, Machine Translation of CN110808651, Feb. 2020 (Year: 2020).*

(Continued)

*Primary Examiner* — Eric Johnson
(74) *Attorney, Agent, or Firm* — Laurence A. Greenberg; Werner H. Stemer; Ralph E. Locher

(57) ABSTRACT

An electric fan drive for a motor vehicle has an electric motor with a rotary field winding that includes a number of phase ends, and also has a motor carrier, arranged on an end face of the electric motor, for fastening and mounting on an installation point. A connection cable with a number of phase lines is provided for electrically conductively coupling the phase ends to a power supply. The motor carrier has axial feedthrough openings, through which the phase ends of the electric motor are guided, the phase lines each having a contact element at a line end facing the phase ends. Each contact element electrically conductively connects the corresponding phase end to the corresponding phase line. A connection housing for receiving the line ends, the phase ends and the contact elements is fastened to the motor carrier.

9 Claims, 7 Drawing Sheets

(56) References Cited

U.S. PATENT DOCUMENTS

| | | | | |
|---|---|---|---|---|
| 2004/0027014 | A1 | 2/2004 | Weigold et al. | |
| 2014/0191598 | A1* | 7/2014 | Winheim | H02K 11/33 310/71 |
| 2019/0334404 | A1* | 10/2019 | Lee | H02K 7/085 |
| 2022/0149696 | A1 | 5/2022 | Kalb et al. | |

FOREIGN PATENT DOCUMENTS

| | | | | |
|---|---|---|---|---|
| DE | 3447826 | A1 | 7/1986 | |
| DE | 10119404 | A1 | 10/2002 | |
| DE | 102011121943 | A1 | 6/2013 | |
| DE | 202011110551 | U1 | 8/2014 | |
| DE | 102014210541 | A1 | 12/2015 | |
| DE | 102016220269 | A1 | 4/2018 | |
| DE | 102019205256 | A1 | 10/2020 | |
| ES | 2218324 | T3 * | 11/2004 | H02K 11/25 |
| JP | 6880349 | B1 | 6/2021 | |
| KR | 20120002740 | A * | 1/2012 | F04D 29/54 |
| WO | WO-2016129287 | A1 * | 8/2016 | H02K 21/22 |

OTHER PUBLICATIONS

Joo, Machine Translation of KR20120002740, Jan. 2012 (Year: 2012).*

Streng, Machine Translation of ES2218324, Nov. 2004 (Year: 2004).*

Yamashita, Machine Translation of WO2016129287, Aug. 2016 (Year: 2016).*

* cited by examiner 8
16
18
44
46
40
50
28
26
42
38
52
64
10
30, 48
70
72
36
54
56
82
34

ELECTRIC FAN DRIVE OF A MOTOR VEHICLE AND FAN MODULE

CROSS-REFERENCE TO RELATED APPLICATION

This application is a continuation, under 35 U.S.C. § 120, of copending International Patent Application PCT/EP2022/073907, filed Aug. 29, 2022, which designated the United States; this application also claims the priority, under 35 U.S.C. § 119, of German Patent Application DE 10 2021 209 722.7, filed Sep. 3, 2021; the prior applications are herewith incorporated by reference in their entirety.

FIELD AND BACKGROUND OF THE INVENTION

The invention relates to an electric fan drive, in particular an electric radiator fan drive, of a motor vehicle, having an electric motor containing a rotary-field winding that contains a number of phase ends, and having a motor carrier arranged on an end face of the electric motor, for fastening and mounting on an installation point. The invention also relates to a fan module containing such a fan drive.

Motor vehicles that have an internal combustion engine generate a considerable amount of heat during operation. Motor vehicles that are driven or can be driven electrically or by an electric motor, such as, for example, electric or hybrid vehicles, usually contain an electric motor as an electric drive system with by one or both vehicle axles can be driven. Such electric motors generate comparatively little waste heat during operation, with the result that only a low cooling capacity is required for the vehicle drive compared to internal combustion engines. In the case of electrically driven or drivable vehicles, however, there is the additional problem that the vehicle battery begins to degenerate at a high battery temperature, for example higher than 45° C. This means that, at such elevated temperatures, electrochemical reactions occur within the battery that damage or completely destroy the battery. Such high battery temperatures occur, for example, when the vehicle is stationary during a process of (rapid) charging of the battery.

Internal combustion engines or vehicle batteries are thus coupled, for example by means of a cooling device such as a (vehicle) air conditioning system. To maintain the operating temperature, or within an air conditioning system, a coolant is typically used, which in turn must be cooled. This is usually achieved by cooling air flowing over cooling fins that are in thermal equilibrium with the coolant. As the airstream is not normally sufficient for cooling, in particular at low travel speeds, it is possible, for example, to fasten to the radiator containing the cooling fins a radiator fan that has a fan frame and an electric (electric-motor) drive, and that generates an additional air flow, which is guided by the frame body. For this purpose, the (radiator fan) drive has an electric motor that is drive-coupled to a drive part, in particular to a fan impeller that generates the air flow. The radiator fan drive and the fan impeller, as well as the fan frame, are in this case often pre-assembled as a so-called radiator fan module, i.e. in the form of a common prefabricated assembly.

Electric radiator fan drives have, for example, brushless electric motors, in which a rotor that is mounted so as to be rotatable with respect to a stator is driven by a rotatory magnetic field. Here, phase windings of the stator or of the rotor (rotary-field winding) are supplied with a corresponding electrical rotary or motor current that is controlled, by open-loop and closed-loop control, by means of a controller as part of a set of (motor) electronics.

The phase ends of the phase windings, or rotary-field winding, are interconnected in a particular way, for example by means of a punched grid, and coupled to an electrical power supply. The type of interconnection is determined by the winding scheme of the rotary-field winding, with a star connection or a delta connection of the phase windings being common as a winding scheme. The punched grid in this case is usually provided with a plastic encapsulation and in the form of a customer interface for the terminal connection of a customer plug, such that current can be fed to the electric motor, and thus the radiator fan drive, easily and with reduced effort by the customer. Disadvantageously, in order to couple the phase ends to the phase terminals of the customer interface in the manner required, such punched grids have a comparatively elaborate and complicated structure or layout.

SUMMARY OF THE INVENTION

The invention is therefore based on the object of specifying a particularly suitable electric fan drive. In particular, a connection of the rotary-field winding to a customer-side termination lead that is as simple as possible in terms of design and reduces the effort involved is to be realized. The invention is also based on the object of specifying a particularly suitable fan module.

With the foregoing and other objects in view there is provided, in accordance with the invention, an electric fan drive for a motor vehicle. The electric fan drive contains an electric motor having a rotary-field winding with a plurality of phase ends and an end face and a termination cable having a plurality of phase leads, for coupling the phase ends to an electrical power supply in an electrically conductive manner. The phase leads each have a contact element at one lead end facing toward the phase ends. The contact element connects respective ones of the phase ends to a respective one of the phase leads in an electrically conductive manner. A motor carrier is disposed on the end face of the electric motor, for fastening and mounting on an installation point. The motor carrier further has axial leadthrough openings formed therein, and through the axial leadthrough openings the phase ends of the electric motor are routed. A termination housing is fastened to the motor carrier for accommodating each lead end and the phase ends, as well as the contact elements.

In respect of the fan drive, the object is achieved according to the invention with the features of the independent fan drive claim, and in respect of the fan module with the features of the independent fan module claim. Advantageous designs and developments are provided by the dependent claims. The advantages and designs cited with regard to the fan drive can also be applied mutatis mutandis to the fan module and vice versa.

The electric fan drive is intended for a motor vehicle and is suitable and configured for this purpose. Preferably, the fan drive is in the form of a radiator fan drive of an electric (radiator) fan module.

The fan drive in this case has a brushless electric motor containing a multi-phase motor winding or rotary-field winding that contains a number of phase ends. The rotary-field winding has a number of phase windings, corresponding to the number of (motor) phases, that are wound, for example, as coils around stator or rotor teeth. The phase or coil windings in this case each have two phase ends that can be connected to each other in a phase-selective manner to form phase strings. In the case of a three-phase electric motor, the rotary-field winding has three phases, commonly designated as U, V, W, with correspondingly six phase ends.

The fan drive has a motor carrier (motor holder) arranged on and end face of the electric motor, for fastening and mounting on an installation point. The installation point in this case is, for example, a retaining ring that is arranged centrally within a fan impeller recess of a fan frame, and that is mechanically connected to the fan frame via struts. The motor carrier is in the form, for example of an end-face cover of the electric motor that is arranged, in particular, on an end face opposite the fan impeller. The motor carrier in this case is, for example, a die-cast part, in particular an aluminum die-cast part. Alternatively, the motor carrier may also be manufactured from a plastic, in which case the motor carrier is in the form, for example, of an injection-molded part.

The fan drive also has a termination cable, in particular in the form of a cable harness or cable loom, having a number of phase leads corresponding to the number of (motor) phases, for coupling the phase ends to an electrical power supply in an electrically conductive manner. The electrical power supply in this case is part of a (vehicle) electrical system, for example. In particular, the electrical power supply is coupled to a converter (inverter) and/or a control device in order to generate the three-phase current required for motor operation. The fan drive thus does not have its own drive or motor electronics. The electronics for supplying the rotary-field winding are therefore external to or separate from the fan drive, and are coupled, or can be coupled, to the fan drive by means of the termination cable as a connection lead or customer cable. In other words, the fan drive is substantially without electronics or of an electronics-free design, and in particular it has no integrated electronics containing a printed circuit board and containing a bridge circuit or inverter circuit.

For the purpose of terminating and contacting the phase ends, the motor carrier has axial leadthrough openings, through which the phase ends of the electric motor are routed. The phase leads in this case each have, at one lead end that faces toward the phase ends, a contact element that connects the phase lead to the respectively assigned phase ends in an electrically conductive manner. Preferably, the phase ends in this case are connected in pairs to a contact element. This means that the phase ends—and thus the phases—are interconnected and contacted by means of the contact elements. To protect against damage and external influences such as, for example, dirt or moisture, fastened to the motor carrier there is a termination housing that accommodates the lead ends and the phase ends, as well as the contact elements and, at least in sections, also the phase leads. The phase ends in this case are positioned, for example via the stator and a positioning aid, in the region of the contact elements. A particularly suitable fan drive is thus realized.

A customer-specific interface of the fan drive, or electric motor, is thus substantially provided in the termination housing. As a result, particularly simple and flexible contacting of the fan drive to a customer-specific power source or to a customer-specific plug-in connector is realized.

Since the phase ends are connected and interconnected substantially directly through the contact elements, there is no need for an elaborate and cost-intensive punched grid. Furthermore, the interconnection and contacting of the phases is effected at the phase ends, such that there is no need to strip the phase wires or phase windings themselves.

As a result, the fan drive according to the invention has a particularly high degree of flexibility in respect of a customer interface, without the need for any changes to the wound electric motor.

The termination housing is preferably joined to the motor carrier in a form-fitting and/or force-fitting manner. The conjunction "and/or" is to be understood here and in the following in such a way that the features linked by means of this conjunction may be realized both together and as alternatives to each other.

A "form fit" or a "form-fitting connection" between at least two parts that are connected to each other is understood here and in the following to mean, in particular, that the cohesion of the parts connected to each other is effected, at least in one direction, by a direct interlocking of the contours of the parts themselves or by an indirect interlocking via an additional connecting part. The "blocking" of a mutual movement in this direction is thus effected by the shape of the parts.

A "force fit" or a "force-fitting connection" between at least two parts that are connected to each other is understood here and in the following to mean, in particular, that the parts connected to each other are prevented from sliding against each other due to a frictional force acting between them. If a "connecting force" that causes this frictional force is absent (this means the force that presses the parts against each other, for example a screw force or the weight force itself), the force-fitting connection cannot be maintained and can thus be released.

In a structurally simple and cost-effective implementation, the termination housing is screw-fastened to the motor carrier. For example, there are screw lugs, having leadthrough openings for screw shanks, formed onto the termination housing, the motor carrier having a threaded hole axially that is aligned with the leadthrough openings of the screw lugs and into which the screw shanks can be threaded or screwed in.

In a preferred design, the termination housing has a carrier plate that bears against the motor carrier, and a cover cap that is joined to the carrier plate, wherein the phase leads are routed on the carrier plate. The phase leads are thus routed parallel to the motor carrier, with the contact elements realizing a substantially perpendicular contacting to the phase ends, such that no bending of the phase leads occurs. This advantageously reduces the mechanical stresses upon the contact element, and thus upon the electrical interfaces between the contact element and the phase ends, as well as between the contact element and the lead ends.

The carrier plate is in the form of an electrically insulating component, in particular an injection-molded component made of an electrically non-conductive plastic. In this case, for example, there are screw lugs formed onto the carrier plate for the purpose of screw fastening to the motor carrier.

The cover cap is preferably of an electrically non-conductive, i.e. insulating, design. For example, the cover cap is in the form of an injection-molded part made from an electrically non-conductive plastic. Preferably, the cover cap is joined directly to the carrier plate in a form-fitting and/or force-fitting manner. In particular, the cover cap is non-destructively and reversibly clipped or latched to the carrier plate. This means that there are corresponding latching or clip structures formed onto the cover cap and/or the carrier plate. This ensures particularly simple and effortless mounting of the cover cap.

An additional or further aspect of the invention provides that, arranged on the carrier plate, there are axially upwardly projecting routing or retaining contours for the phase leads and/or the contact elements. The routing contours in this case are formed onto the carrier plate, in particular formed integrally, i.e. in one piece or monolithically. This enables simple routing, positioning and laying of the phase leads. Furthermore, the phase leads and/or the contact elements are thus also reliably and securely held in the wanted position even when (motor) vibrations occur during operation, such that the mechanical stresses upon the contact elements are advantageously reduced.

In an expedient design, the termination cable has a ground lead having a ground contact, wherein the ground contact is coupled mechanically and in an electrically conductive to the motor carrier. The motor carrier thus acts as a ground or earth, i.e. as an electrical reference potential. The earth contact in this case is in the form of a cable lug, for example, that is joined to the motor carrier by means of a screw connection.

An additional or further aspect of the invention provides that the contact element, for example in the form of a cable lug, is in the form of a metallic stamped-bent part that has a first interface to the lead end and has a second interface to at least two phase ends. The contact element, and in particular the first interface, is intended in this case to be attached to the lead ends in a fully automated or at least semi-automated manner, and is suitable and configured for this purpose. The contacting or connection of the first interface to the lead ends is effected, for example, by crimping, welding, soldering or by means of an insulation-displacement terminal. The contacting or connection of the second interface to the phase ends is preferably affected by means of a materially bonded welded or soldered joint.

A "material bond" or a "materially bonded connection" between at least two parts that are connected to each other is understood here and in the following in particular to mean that the parts connected to each other are held together at their contact surfaces by material union or cross-linking (for example due to atomic or molecular bonding forces), possibly under the action of an additive.

In a preferred development, the second interface is fork-shaped with at least two fork prongs. In particular, a "fork shape" or "fork-shaped" is understood here to mean in particular a cross-sectional shape having at least two parallel fork prongs that are spaced apart from each other and that are orientated along a longitudinal direction of the contact element. The fork prongs in this case form, for example, terminal lugs for the phase ends, and thus allow the phase ends to be connected individually (welding, soldering).

For the purpose of interconnecting and contacting two phase ends to a second interface that has two fork prongs, the phase ends are preferably first twisted together, and then the twisted phase ends are inserted into the receiver formed between the fork prongs, and finally contacted (welded, soldered) to the fork prongs, or the contact element.

In an advantageous design, the second interface has three fork prongs. This means that the second interface is approximately trident-shaped. In the case of such a fork shape, also referred to below as a double-fork structure, no additional twisting of the phase ends is necessary before contacting; instead, the phase ends may be connected directly to the contact element, or the fork prongs. For this purpose, one of the phase ends is positioned in the receiver between two adjacent fork prongs. This means that the phase ends sit in-between the fork prongs and are flanked or framed laterally by them. Particularly stable holding against lateral forces is thus realized.

In a particularly stable implementation, the contact element is bent over in the region of the second interface in such a way that the second interface has two plies or two layers. For this purpose, for example, an elongate hole is punched into the contact element, and then the contact element is bent or folded over approximately in the center and transversely to the elongate hole, such that the fork prongs are formed substantially by the folded edge of the elongate hole, and such that an approximately U-shaped receiver or cutout is formed between the fork prongs by the mutually superimposed elongate hole arranged. This improves the mechanical stability of the second interface, with the result that the mechanical stability of the electrical connection or interconnection to the phase ends is also increased. Due to the resulting increase in material thickness, the folding of the contact element is also advantageous in respect of a welded contacting and for the current-carrying capacity of the contact realized as a result.

The fan module according to the invention is intended for a motor vehicle and is suitable and configured for this purpose. Preferably, the fan module is in the form of a radiator fan module. The fan module has a fan frame that has a fan impeller recess and, rotatably mounted therein, a fan impeller that is driven by a fan drive described above.

Other features which are considered as characteristic for the invention are set forth in the appended claims.

Although the invention is illustrated and described herein as embodied in an electric fan drive of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In all figures, mutually corresponding parts and sizes are in each case denoted by the same reference designations.

Figure 1:
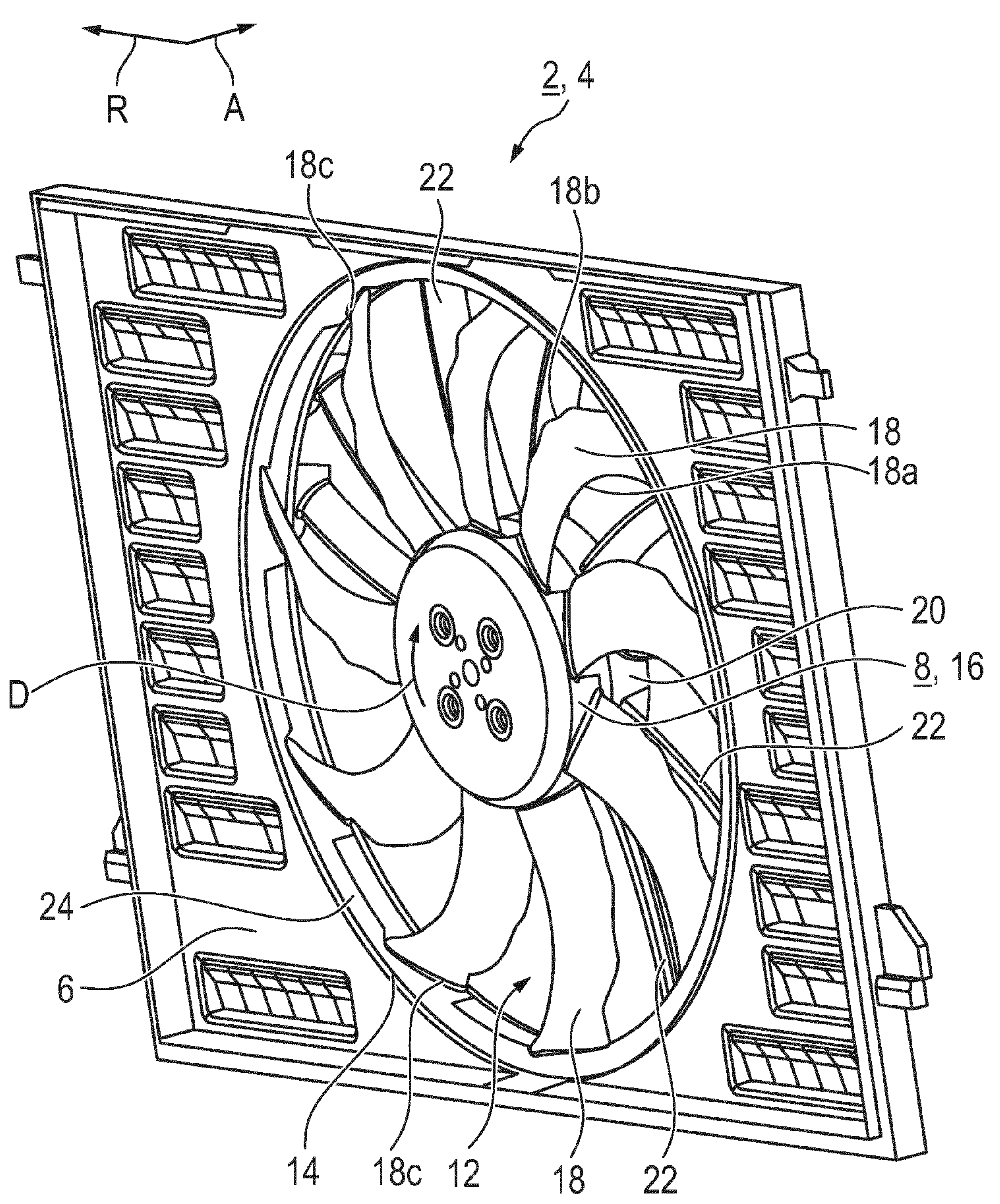
FIG. 1 is a diagrammatic, perspective representation of a fan module according to the invention.

Referring now to the figures of the drawings in detail and first, particularly to FIG. 1 thereof, there is shown a perspective representation of a fan module 2, implemented as a radiator fan module, containing a (radiator) fan 4. The fan 4 has a fan frame 6 and a fan impeller 8 that is driven, or can be driven, by a (radiator) fan drive 10 (FIG. 2, FIG. 3) of the fan module 2. The fan module 2 is intended and configured to be fitted into the front of a motor vehicle. In particular, the fan 4 in this case is in the form of an axial fan.

Realized in the fan frame 6 there is a fan impeller recess 12 that is or becomes delimited by a frame ring 14. The fan impeller 8 has a central hub cup 16, on the outside of which there are formed a number of blades (fan blades, air guide vanes) 18 that are oriented in the radial direction R. In this exemplary embodiment, the fan impeller 8 has nine blades 18. In the figures, the blades 18 are denoted by reference designations merely by way of example.

A retaining ring 20 coupled to the fan drive 10 is arranged centrally within the fan impeller recess 12 and is mechanically connected to the fan frame 6 via struts 22. The retaining ring 20 in this case is held, for example by means of ten struts 22, within the fan impeller recess 12. In the figures, the struts 22 are denoted by reference designations merely by way of example.

The struts 22 are arranged behind the fan impeller 8 as viewed in the direction of conveyance of the air flow generated during operation of the fan module 2, i.e. in the axial direction A.

When the fan module 2 is in operation, the fan impeller 8 arranged in the fan impeller recess 12 is driven in rotation by the fan drive 10, in the direction of rotation indicated by the arrow D in the figures. The direction of rotation D in this case is parallel to a tangential or circumferential direction of the fan impeller recess 12, or of the frame ring 14. The blades 18 are designed, in this direction of rotation D, to be concave at their front edges **18*a* and substantially convex and preferably undulated at their rear edges 18*b***.

Here and in the following, "axial" or an "axial direction A" is understood in particular to mean a direction parallel to (coaxial with) the axis of rotation of the fan 4, i.e. perpendicular to the end faces of the fan impeller 8. Accordingly, here and in the following "radial" or a "radial direction R" is understood in particular to mean a direction orientated perpendicularly (transversely) with respect to the axis of rotation of the fan 4, along a radius of the fan drive 10. Here and in the following, "tangential" or a "tangential direction" is understood in particular to mean a direction along the circumference of the fan drive 10 (circumferential direction, azimuthal direction), i.e. a direction, perpendicular to the axial direction A and the radial direction R, that is orientated substantially parallel to the direction of rotation D.

The blades 18 are connected, or mechanically coupled, to each other at their blade tips **18*c* by means of a circumferential outer ring 24. The outer ring 24 serves, inter alia, to stabilize the blades 18 during the rotational motion of the fan impeller 8. In addition, the air flow is directed by means of the outer ring 24, improving the aerodynamic properties of the fan impeller 8**.

The fan module 2 is preferably provided as a (pre) assembled assembly, and thus has a fan 4 formed by the fan frame 6 and the fan impeller 8, as well as the fan drive 10.

Figure 2:
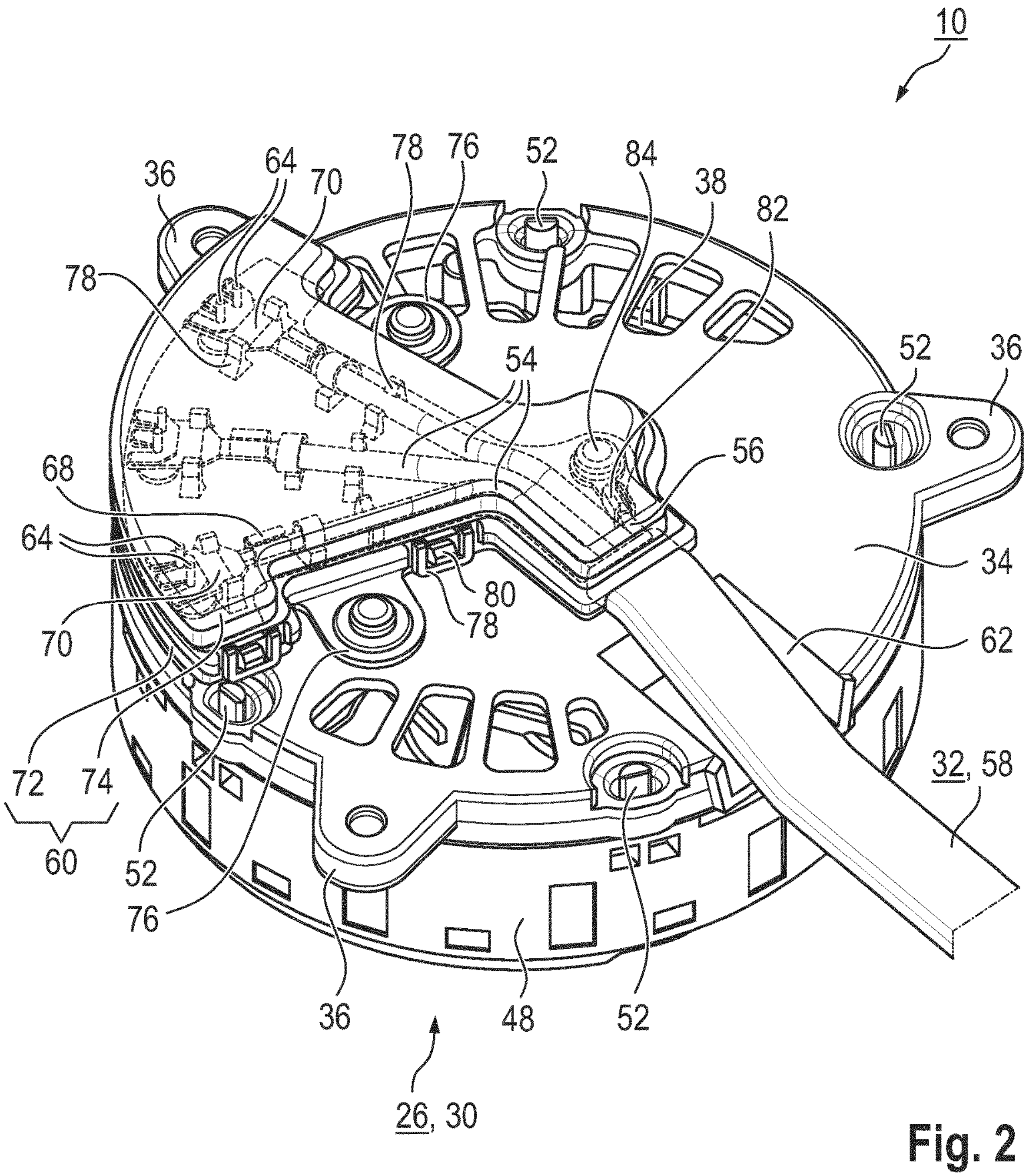
FIG. 2 is a perspective representation of a fan drive.
Figure 3:
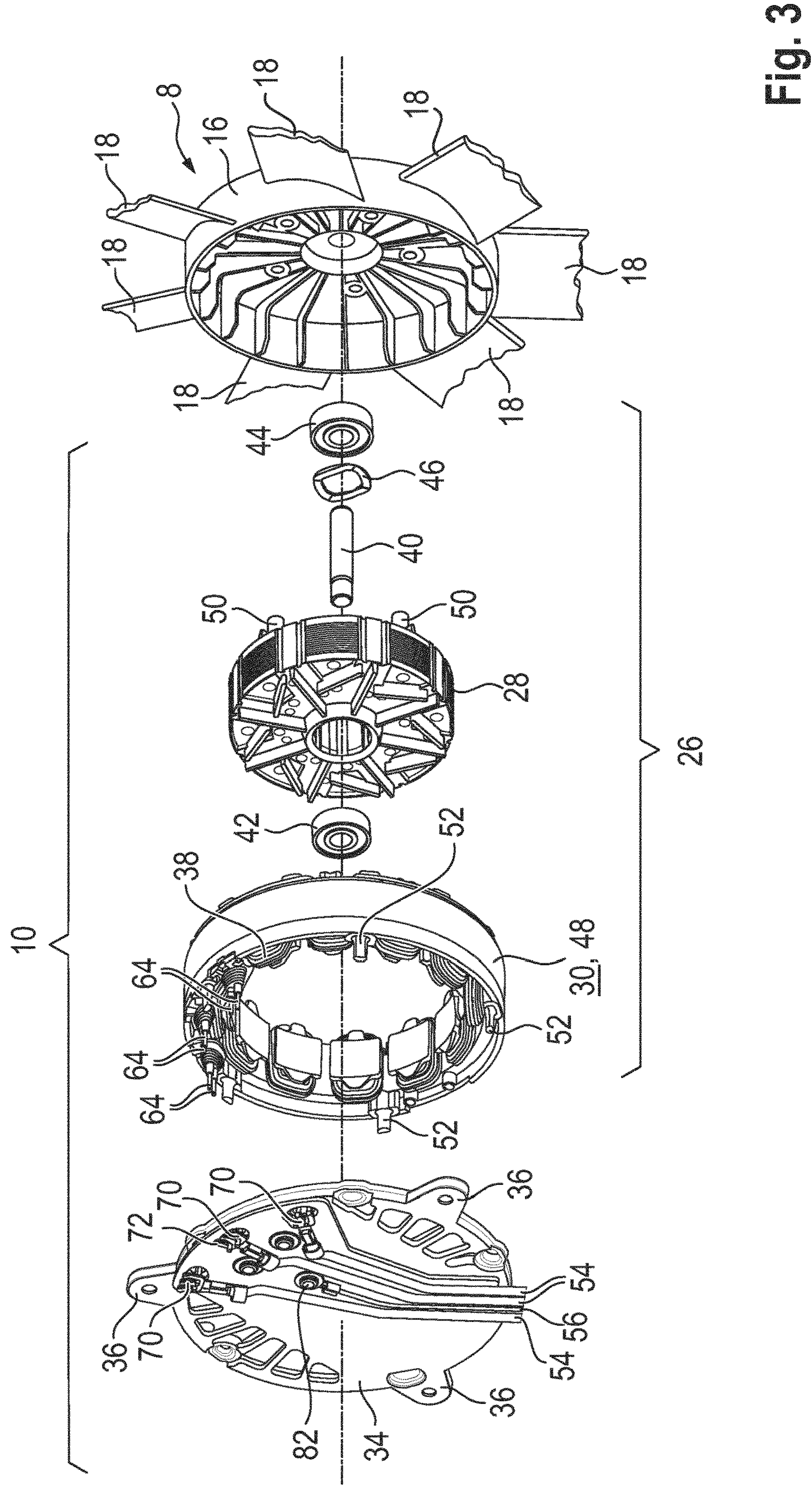
FIG. 3 is an exploded, perspective representation of the fan drive.

Held in the retaining ring 20 is a brushless electric motor 26 of the fan drive 10 represented individually in FIG. 2 and FIG. 3, the rotor 28 of which is surrounded by a stator 30. In other words, the electric motor 26 is realized, in particular, as an internal rotor. The fan drive 10, or the electric motor 26, is terminated or can be terminated to an electrical power or energy supply, in particular to an inverter or an inverter circuit, by means of a termination cable 32 routed on the struts 22.

FIG. 2 shows the fan drive 10 with a view of a motor carrier 34 arranged at the end face of the electric motor 26. When in the assembled state, the fan drive 10, and the electric motor 26, are fastened, in particular screw-fastened, to the retaining ring 20 by means of the motor carrier 34. For this purpose, the motor carrier 34 has three circumferentially arranged screw lugs 36. The retaining ring 20 thus forms an installation point for the fan drive 10.

The electric motor 26 is thus attached, on the rear side of the fan impeller 8, via the retaining ring 20, to the struts 22, which in turn are connected to the fan frame 6. The electric motor 26 is thus rigidly connected to the fan frame 6, and the rotor 28 of the electric motor 26 is held together with the fan impeller 8 so that it can move in rotation in the fan impeller recess 12 of the fan frame 6.

In this exemplary embodiment, the stator 30 is wound with a three-phase rotary-field winding 38 in the form of coils. The permanently energized rotor 28 is mounted inside the stator 30 so as to be rotatable about a motor shaft 40. To support the rotor 28, the electric motor 26 contains two roller bearings 42, 44, which act on the rotor 28 from axially opposite sides. The axial play of the rotor 28 between the two roller bearings 42, 44 is cushioned, for example, by a spring washer 46. The approximately disk-shaped or half-shell-shaped motor carrier 34 is arranged on the end face of the electric motor 26 that faces away from the fan impeller 8.

The rotor 28 is formed (in a manner not represented in detail) by a laminated core, into which permanent magnets are inserted to generate an excitation field, the laminated core, together with the inserted permanent magnets, being overmolded with a plastic sheath. Similarly, the stator 30 is also composed of a laminated core, which is overmolded with a plastic sheath 48. On its front side, the rotor 28 is provided with four screw domes 50, by means of which the rotor 28 is screw-connected to the fan impeller 8 when in the assembled state.

In this exemplary embodiment, the electric motor 26 is implemented without a housing, i.e. without a tubular housing surrounding the stator 30, at least in sections, such that the plastic sheath 48 in effect forms the motor housing of the electric motor 26. Preferably, there are axially projecting caulking nubs 52 formed onto the end face of the plastic sheath 48, in the direction of the motor carrier 34, that are heat-caulked with the motor carrier 34 in particular for the purpose of fastening the electric motor 26 to the motor carrier 34. The motor carrier 24 in this case is implemented, for example, as a die-cast part made of aluminum.

The plastic sheath 48 has—as can be seen in FIG. 2—for example, window-like cutouts or openings arranged tangentially in a distributed manner around its outer circumference. The stator yoke of the stator 30 is therefore not fully enclosed by the plastic sheath 48, but is exposed to the outside in some regions. As a result, during operation of the motor, an air flow can enter between the layers of the stator laminated core and thus remove heat from the stator 30. This improves the cooling of the stator 30, and thus of the electric motor 26.

The termination cable 32 is in the form of a cable harness or cable loom, and has a number of phase leads 54 corresponding to the number of motor phases, and a ground lead 56. The leads 54, 56 are surrounded, for example, by a cable sheath 58. The leads 54, 56 protrude at the end from the cable sheath 58 and are accommodated at the end in a termination housing 60. In the embodiment shown in FIG. 2, the motor carrier 34 has, for example, a ramp-like routing contour 62 for routing the termination cable 32 to the termination housing 60.

For each (motor) phase, the rotary-field winding 38 has a phase winding, which are wound as coils on stator teeth of the stator 30. The coil or phase ends 64 in this case are orientated axially and routed through axial leadthrough openings 66 (FIG. 4, FIG. 5) of the motor carrier 38, such that the phase ends 64 of an outward-facing upper side of the motor carrier 38 project axially upward, at least in sections. The phase ends 64 in this case are routed in pairs through a leadthrough opening 66. In the figures, the phase ends 64 are denoted by reference designations merely by way of example.

For the purpose of terminating and contacting the phase ends 64, the phase leads 54 each have, at a lead end 68 that faces toward the phase ends, a contact element 70 that connects the phase lead 54 in an electrically conductive manner to two respectively assigned phase ends 64. In the figures, the contact elements 70 and the lead ends 68 are denoted by reference designations merely by way of example.

The termination housing 60 is substantially implemented in two parts, and has a carrier plate 72 and a cover cap 74, which are each implemented as injection-molded plastic parts. The cover cap 74 is represented as partially transparent in FIG. 2.

The substantially flat carrier plate 72 is arranged on the motor carrier 34 and is screw-fastened to it. In the implementation shown in FIG. 2, the carrier plate 72 has two formed-on screw lugs 76 for this purpose, whereas in the carrier plate 72 shown in FIGS. 3 to 5, the screw fastening is affected within the carrier plate surface. The carrier plate 72—and thus the termination housing 60—is in this case joined to the motor carrier 34 for example by means of two screws.

In FIG. 2, the carrier plate 72 has a number of axially projecting, integrally formed-on routing contours 78, by means of which the phase leads 54 and the contact elements 70 are routed and held on the carrier plate 72. The routing contours 78, which are denoted by reference designations merely by way of example, are in this case arranged in pairs and are in the form, for example, of retaining or clamping lugs for mounting of the phase leads 54 and the contact elements 70 in a form-fitting and/or force-fitting manner. The phase leads 54 are routed parallel to the motor carrier 34 by means of the routing contours 78, the contact elements 70 realizing a substantially right-angled contacting to the phase ends 64, such that no bending of the phase leads 54 occurs.

The shell-shaped or cup-shaped cover cap 74 is preferably joined to the carrier plate 72 without use of tools. In particular, the cover cap 74 is clipped or latched to the carrier plate 72 in a form-fitting and/or force-fitting manner. For this purpose, the cover cap 74 has a number of latching tabs 79 arranged distributed around the circumference, each of which has a window-like cutout for a nose-shaped latching extension 80 of the carrier plate 72. The carrier plate 72 in this case has, for example, a circumferential, axially projecting edge onto which the latching extensions 80 are formed so as to project vertically or radially. In the fastened state, the latching extension 80 engages in the cutout of the latching tab 79.

Figure 4:
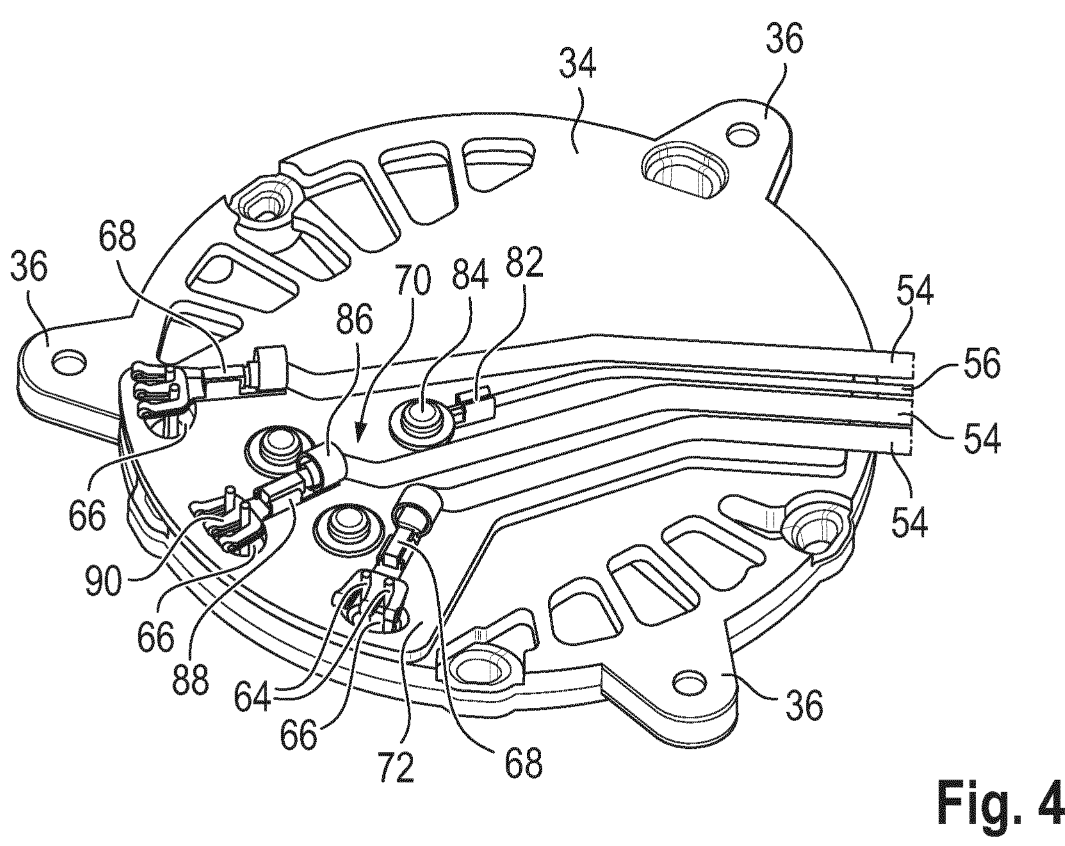
FIG. 4 is a perspective representation of a motor carrier with a carrier plate and a termination cable.
Figure 5:
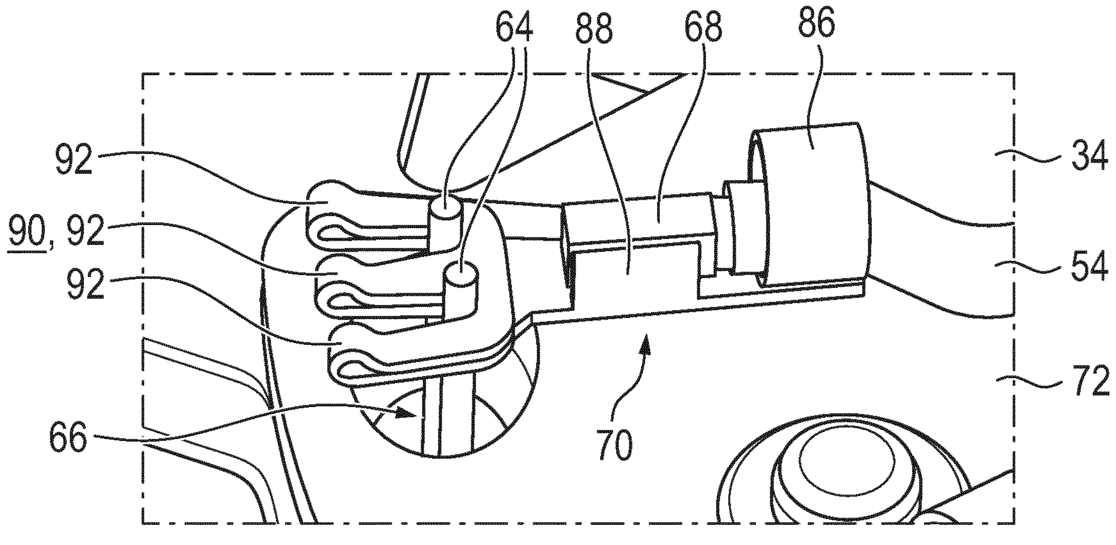
FIG. 5 is a perspective representation of a portion of a contact element with a phase end and a lead end.

For the carrier plate 72 represented in FIG. 3 to FIG. 5, the routing contours 78 and latching extensions 80 are not shown in more detail. The carrier plate 72 of FIG. 3 to FIG. 5 extends in this case in the manner of a secant over the upper side of the motor carrier 34, the carrier plate 72 of FIG. 2 being substantially limited to a square of the approximately circular motor carrier 34.

The ground lead 56 has a ground contact 82, in the form of a cable lug, at the end of the lead, for contacting to an electrical earth or ground potential. For this purpose, the carrier plate 72 has a leadthrough opening for a screw 84, with the motor carrier 34 having a correspondingly aligned threaded hole for the screw 84. The screw 84 is made of an electrically conductive material, such that the ground contact 82, when in the screw-fastened state, is mechanically and electrically coupled to the motor carrier 34. The motor carrier 34 thus acts as a ground or earth for electronics connected to the termination cable 32, or to the ground lead 56.

Figure 6:
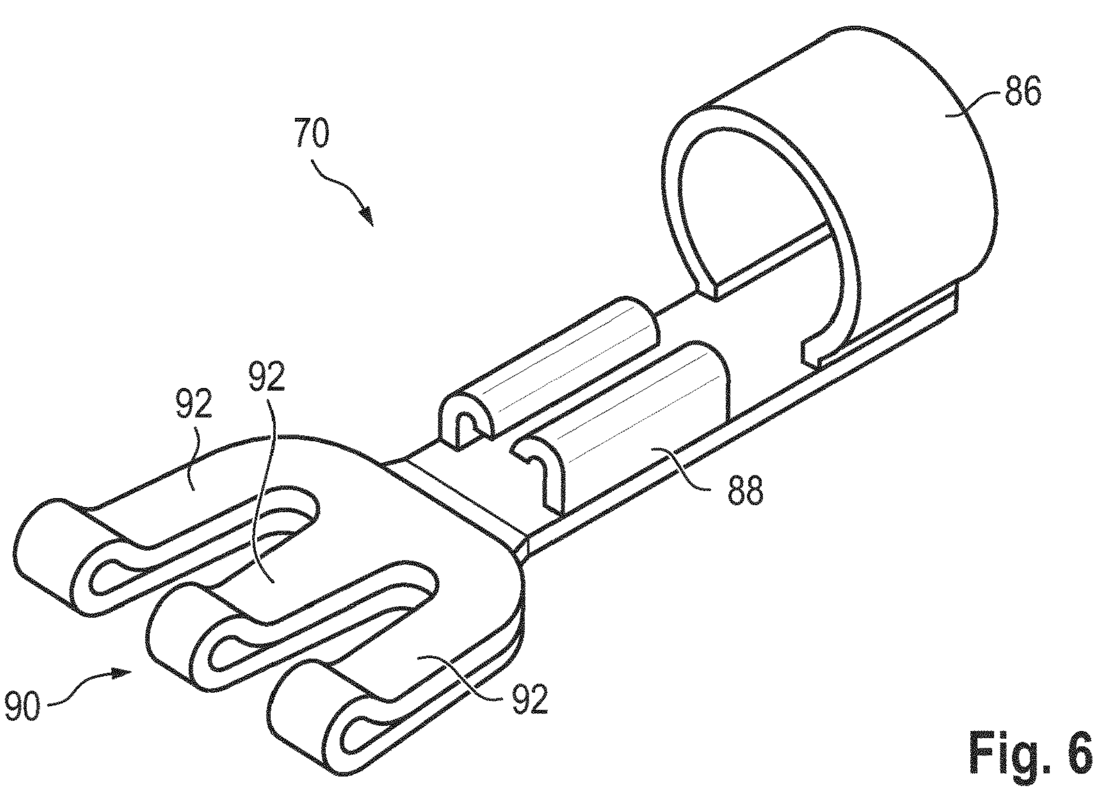
FIG. 6 is a perspective representation of the contact element.

The contact elements 70 are explained in more detail below with reference to FIGS. 4 to 6. The contact element 70 represented individually in FIG. 6 is implemented approximately in the form of a cable lug with a sleeve-shaped conductor receiver 86, and with a first electrical interface 88 and with a second electrical interface 90.

The conductor receiver (lead holder) 86 is intended to be deformed by means of a crimping tool, and is suitable and configured for this purpose, such that a form-fitting and/or force-fitting connection to the respective phase lead 54 can be realized. In the deformed state, the conductor receiver 86 in this case provides strain relief and anti-kink protection for the contacting of the interfaces 88, 90.

The interface 88 is intended for contacting to the lead ends 68, and is suitable and configured for this purpose. In the exemplary embodiment shown, the interface 88 is in the form of two inwardly bent crimp tabs that are designed, in particular, for crimp connection to the lead ends 68. Alternatively, the interface 88 May be implemented as an insulation-displacement terminal, or as a welded or soldered joint.

The interface 90 is intended for contacting to two phase ends 64 in each case, and is suitable and configured for this purpose. The interface 90 in this case is in the form of a fork having three fork prongs 92. As can be seen in particular in FIG. 5, the phase ends 64 are inserted into the interspaces between the fork prongs 92, such that each phase end 64 is flanked by two fork prongs 92 in each case. For the purpose of contacting, the phase ends 64 are soldered or welded to the fork prongs 92.

Figure 7:
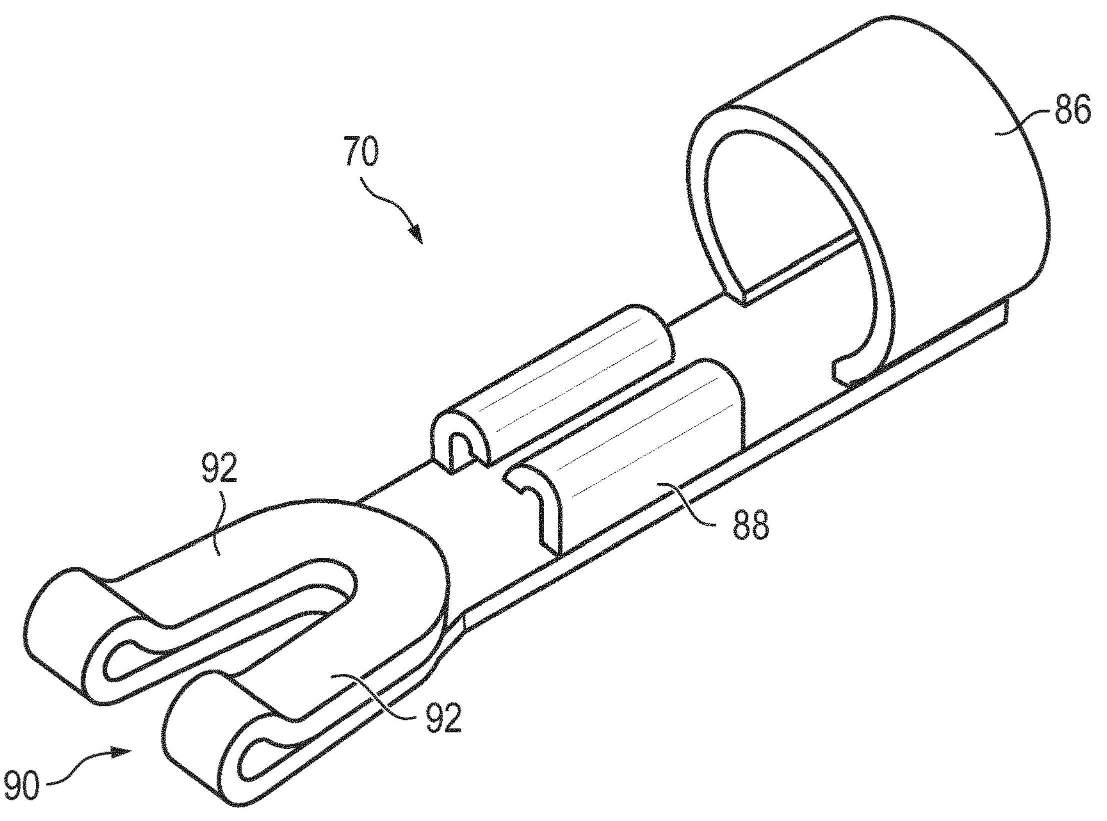
FIG. 7 is a perspective representation of the contact element in an alternative embodiment.

FIG. 7 shows an alternative embodiment of the contact element 70, in which the interface 90 has only two fork prongs 92. In this implementation, the two phase ends 64 are preferably first twisted together, and the twisted phase ends 64 are placed in the interspace or receiver between the fork prongs 92, for subsequent connection by welding or soldering.

For the purpose of stabilizing and stiffening the interface 90, it is preferably implemented in two layers or two layers, such that the contact element 70 has an increased height or thickness locally. For this purpose, at the end that faces toward the phase ends 64, the contact element 70 is bent over or folded by approximately 180° in the direction of the interface 88. For this purpose, for example, an elongate hole (FIG. 7) or two elongate holes (FIG. 6) are punched into the contact element 70, and then the contact element 70 is bent over or folded approximately in the center and transversely with respect to the elongate hole, such that the fork prongs 92 are formed substantially by the folded edge of the elongate hole.

Figure 8:
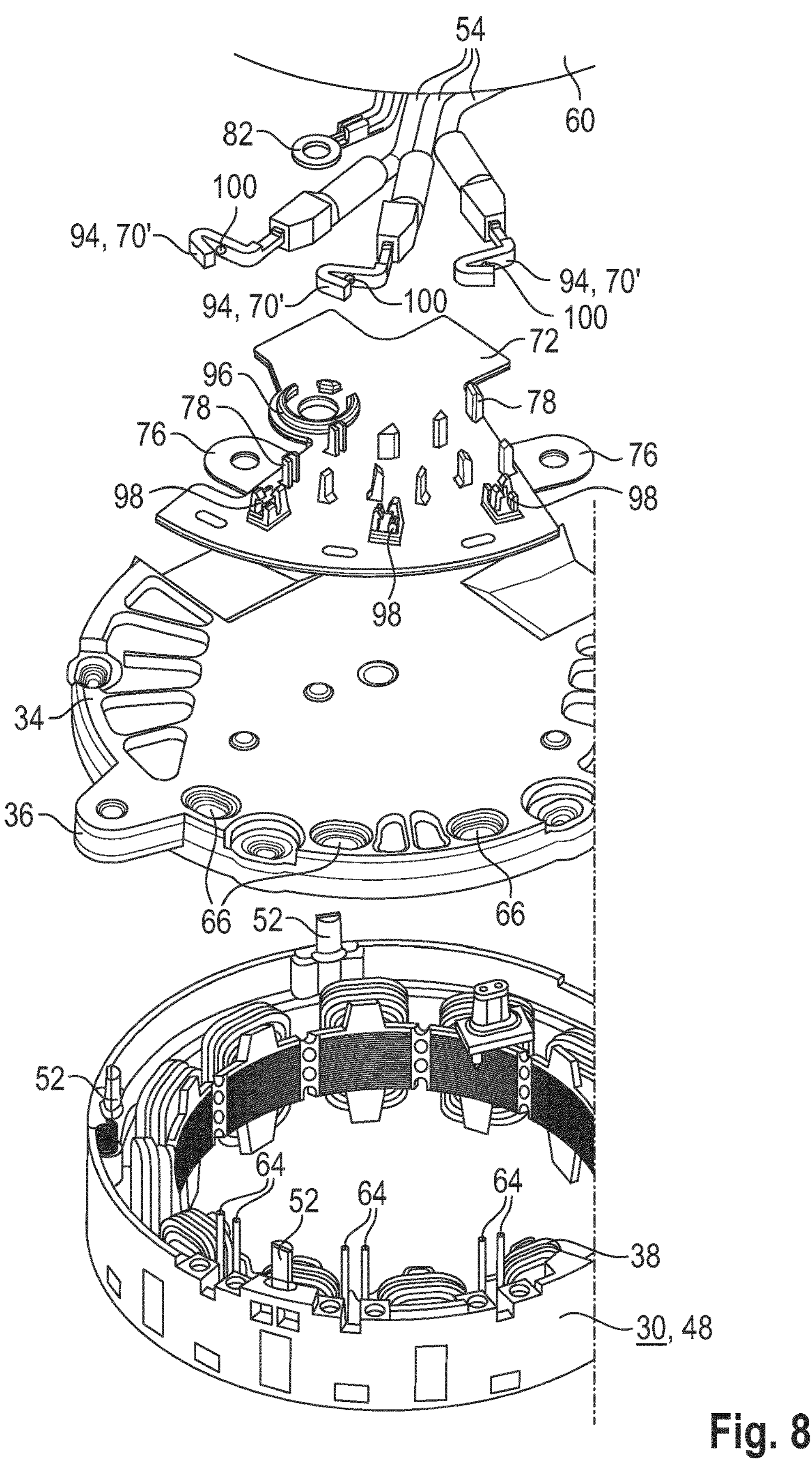
FIG. 8 is an exploded, perspective representation of a portion of the fan drive with alternative contact elements.
Figure 9:
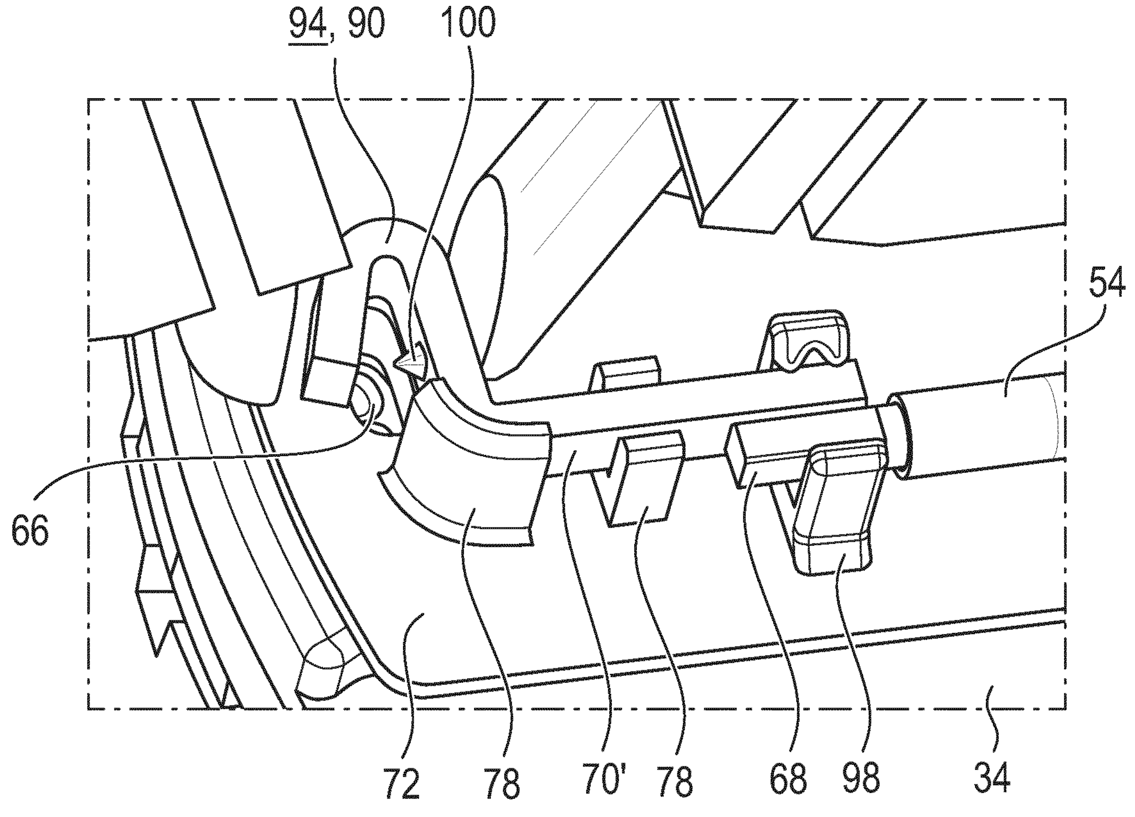
FIG. 9 is a perspective representation of the alternative contact element with a lead end.

A second exemplary embodiment for the contact element 70' is explained in more detail below with reference to FIG. 8 and FIG. 9. In this embodiment, the contact element 70' is designed for a hook weld to the phase ends 64. The contact element 70' in this case is substantially hook-shaped, and in the assembled state there is an approximately U-shaped hook bend 94 routed around the leadthrough opening 66 in such a way that the phase ends 64 are framed by the vertical U-legs (FIG. 9). The hook bend 94 in this case forms the interface 90 of the contact element 70'. The phase ends 64 are not represented in FIG. 9.

In this implementation, the carrier plate 72 has, for example, a retaining contour 96 for the ground contact 82, which is in the form of an axially upwardly projecting, segmented circular ring. The carrier plate 72 also has, for each contact element 70', an approximately U-shaped upwardly projecting clamping contour 98, by means of which the interface 88 of the contact element 70' is clamped to the respective lead ends 68 (FIG. 9). This clamping serves, for example, as a pre-fixing before the contact element 70' is soldered or welded to the lead end 68.

The hook bend 94 has, for example, a conical extension 100 that is arranged, or can be arranged, between the two phase ends 64 to be contacted.

The invention is not limited to the exemplary embodiments described above. Rather, other variants of the invention may also be derived from it by a person skilled in the art, without departure from the subject-matter of the invention. In particular, all of the individual features described in connection with the exemplary embodiments can also be combined with one another in other ways without departure from the subject-matter of the invention.

Thus, in particular, the contact element 70 is inventive per se and therefore constitutes an invention in its own right.

The following is a summary list of reference numerals and the corresponding structure used in the above description of the invention:

2 fan module
4 fan
6 fan frame
8 fan impeller
10 fan drive
12 fan impeller recess
14 frame ring
16 hub cup
18 blade
**18*a*** front edge
**18*b*** rear edge
**18*c*** blade tip
20 retaining ring/installation point
22 strut
24 outer ring
26 electric motor
28 rotor
30 stator
32 termination cable
34 motor carrier
36 screw lug
38 rotary-field winding
40 motor shaft
42 roller bearing
44 roller bearing
46 spring washer
48 plastic sheath
50 screw dome
52 caulking nub
54 phase lead
56 ground lead
58 cable sheath
60 termination housing
62 routing contour
64 phase end
66 leadthrough opening
68 lead end
70, 70' contact element
72 carrier plate
74 cover cap
76 screw lug
78 routing contour
79 latching tab
80 latching extension
82 ground contact
84 screw
86 conductor receiver
88 interface
90 interface
92 fork prong
94 retaining bend
96 retaining contour
98 clamping contour
100 extension
A axial direction
R radial direction
D direction of rotation

The invention claimed is:

1. An electric fan drive for a motor vehicle, the electric fan drive comprising:

an electric motor having a rotary-field winding with a plurality of phase ends and an end face;

a termination cable having a plurality of phase leads, for coupling said phase ends to an electrical power supply in an electrically conductive manner, said phase leads each having a contact element at one lead end facing toward said phase ends, said contact element connecting at least two respective ones of said phase ends to a respective one of said phase leads in an electrically conductive manner, wherein said contact element is in a form of a stamped-bent part that has a first interface to said lead end and has a second interface to at least two said phase ends;

a motor carrier disposed on said end face of said electric motor, for fastening and mounting on an installation point, said motor carrier further having axial leadthrough openings formed therein, through said axial leadthrough openings said phase ends of said electric motor being routed; and a termination housing fastened to said motor carrier for accommodating each said lead end and said phase ends, as well as each said contact element.

2. The fan drive according to claim 1, wherein said termination housing is screw-fastened to said motor carrier.

3. The fan drive according to claim 1, wherein said termination housing has a carrier plate that bears against said motor carrier, and a cover cap joined to said carrier plate, wherein said phase leads are routed on said carrier plate.

4. The fan drive according to claim 3, further comprising axially upwardly projecting routing contours disposed on said carrier plate, said axially upwardly projecting routing contours routing and holding said phase leads.

5. The fan drive according to claim 1, wherein said termination cable has a ground lead with a ground contact, wherein said ground contact is coupled mechanically and in an electrically conductive to said motor carrier.

6. The fan drive according to claim 1, wherein said second interface is fork-shaped with at least two fork prongs.

7. The fan drive according to claim 6, wherein said at least two fork prongs of said second interface are two of three said fork prongs, wherein each said of said phase ends sits in-between two adjacent said fork prongs.

8. The fan drive according to claim 1, wherein said contact element is bent over in a region of said second interface such that said second interface has two plies.

9. A fan module for a motor vehicle, the fan module comprising:

a fan frame having a fan impeller recess formed therein;

a fan impeller rotatably mounted in said fan impeller recess; and said fan drive according to claim 1 for driving said fan impeller.

* * * * *